Patented July 4, 1950

2,513,487

UNITED STATES PATENT OFFICE 2,513,487

1 - (AMINOALKYL) - 1,2,3,4 - TETRAHYDRO-FLUORANTHENES AND THEIR PRODUCTION

Karl Hoffmann, Basel, and Eugen Tagmann, Birsfelden, Switzerland, assignors to Ciba Pharmaceutical Products, Inc., Summit, N. J.

No Drawing. Application December 10, 1946, Serial No. 715,346. In Switzerland December 21, 1945

19 Claims. (Cl. 260—293)

This invention relates to new amine derivatives derived from hydrogenated fluoranthenes and to processes for their production.

These new compounds are produced by reacting hydrogenated fluoranthenes in the presence of hydrohalogen splitting agents with alkyl halides which contain a basic group and if desired treating the compound obtained with reducing and/or quarternizing agents. Alternatively, the alkyl halide may contain a substituent convertible into a basic group in which case after the reaction with the hydrogenated fluoranthene the said substituent is converted to the basic group. This reaction is all the more surprising as experiments have shown that the corresponding reaction of 1-phenyl-tetraline and 1-phenylindane with alkyl halides which contain a basic group cannot be carried out, although these compounds contain also a methine group.

As starting materials, hydrogenated fluoranthenes having a hydrogen atom in the 1-position, such as 1,2,3,4-tetrahydrofluoranthene or substituted derivatives such as 2,2,4-trimethyl-1,2,3,4-tetrahydrofluoranthene are employed. The alkyl residue of the alkyl halide used for the reaction may be straight, branched or arranged as part of a ring. The alkyl halides contain as basic groups for example an amino group substituted by aliphatic, alicyclic, araliphatic or heterocyclic residues, in which amino group the nitrogen atom may also form part of a ring such as the piperidine or morpholine ring. Suitable substituents convertible into basic groups are, for example, halogen atoms, hydroxy, acylamino or nitrile groups. Particularly suitable as reactants according to the present invention are the following: chloroethyldiethylamine, chloroethyldibutylamine, chloroethylpiperidine, chloroethylmorpholine, chloropropyldimethylamine, bromopropyldiethylamine, chlorobutyldiethylamine, chloropentylpiperidine, dimethylaminocyclohexylhalides, halogen-N-alkyl piperidines such as 3-chloro-N-methyl-piperidine, 1-chloro-2-hydroxyethane, 1-bromo-3-chloropropane, 1-chloro-2-hydroxyethane-p-toluene sulfonic acid ester or chloracetonitrile.

The alkylation is carried out suitably in the presence of inert solvent, such as for example, toluene, benzene, xylene, nitrobenzene and if necessary in the presence of indifferent gases, such as nitrogen. As hydrohalogen splitting agents there may be used: alkali and alkaline earth metals, such as sodium, potassium, lithium, calcium, their amides, hydrides, hydrocarbon compounds or alcoholates, as for example sodamide, sodium hydride, butyl lithium, phenyl potassium, phenyl lithium, potassium tertiary butylate, or potassium tertiary amylate. If the reaction results in compounds which contain substituents convertible into basic groups, then these are converted into the basic groups later; thus for example a hydroxy group first is replaced by a halogen atom and the halogen compound obtained treated with ammonia or amines; an acylamino compound is hydrolyzed; or a nitrile converted to the corresponding amine by reduction.

The partially reduced fluoranthene derivatives obtained may be further saturated with hydrogen, for example with the aid of catalytically activated hydrogen.

The new amines form salts easily, for example, with hydrochloric, phosphoric or sulfuric acids.

Quarternization of the compounds thus obtained may be accomplished by treatment with alkyl halides, alkenyl halides, arylsulfonic acid esters, dialkyl sulfates or aralkyl halides.

The products obtained according to the process possess valuable pharmacological properties, some of them exhibiting a wholly new type of pharmacological activity characterized by a shift in the sensitivity of the vagus center for respiratory sensory impulses exclusively toward the inspiratory phase. They also possess powerful spasmolytic properties.

The invention is described in greater detail in the following examples which are presented by way of illustration and not of limitation. The same relation exists between parts by weight and parts by volume as exists between grams and cubic centimeters.

Example 1

50 parts by weight of 1,2,3,4-tetrahydrofluoranthene and 35 parts by weight of β-chloroethyldiethylamine are heated several hours in 200 parts by volume of toluene in the presence of 12 parts by weight of sodamide. At the end of the reaction, the toluene solution obtained is shaken first with water and then with dilute hydrochloric acid. Thereupon, the hydrochloride of 1-(β-diethylaminoethyl)-1,2,3,4-tetrahydrofluoranthene of the formula

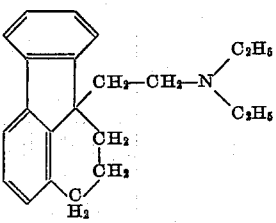

crystallizes out. The compound can be recrystallized and melts at 240–241° C. The free base forms a yellow oil of boiling point (under a pressure of 0.1 mm.) of 170–172° C. Other salts of this base may also be formed as for example, an acid sulfate of melting point 168–170° C., a nitrate of melting point 158–160° C., and a phosphate, which crystallized with one mol of water of crystallization and after rigorous drying has a melting point of 160–163° C. The phosphate is easily soluble in water while the other salts named are not so readily soluble.

Tetrahydrofluoranthene may also first be reacted with phenylpotassium and the resultant reactive alkali metal compound then reacted with chloroethyldiethylamine.

1-[N-methyl-piperidyl-(3)]-1,2,3,4-tetrahydrofluoranthene is obtained in similar manner by the reaction of 1,2,3,4-tetrahydrofluoranthene with 3-chloro-N-methylpiperidine.

*Example 2*

41.2 parts by weight of 1,2,3,4-tetrahydrofluoranthene are heated in 300 parts by volume of toluene first with 8 parts by weight of sodamide under nitrogen at 100° C. and maintained for several hours at this temperature. After the evolution of ammonia ceases, 45 parts by weight of β-chloroethyldimethylamine are dropped in slowly at 95–100° C. and heated an additional 2 hours under reflux. After cooling the toluene solution is mixed with water, extracted with dilute phosphoric acid solution and the aqueous portion made alkaline. The thus precipitated base is extracted with ether, the ether solution dried over potassium carbonate, the ether evaporated and the residue distilled in vacuum. The 1-(β-dimethylamino-ethyl)-1,2,3,4 - tetrahydrofluoranthene is thus obtained as an oil which boils at 150–154° C. under a pressure of 0.09 mm. After standing for a short time, crystals of melting point 78–80° C. are formed; the product may be converted into its hydrochloride which melts at 263° C.

In the above reaction, it is possible to employ phenyl sodium also instead of sodamide. Furthermore, xylene may be substituted for the toluene.

If, instead of the 45 parts by weight of β-chloroethyldimethylamine, the 41.2 parts by weight of 1,2,3,4-tetrahydrofluoranthene are reacted with 30 parts by weight of β-chloroethylpiperidine, there is then obtained 1-(β-piperidinoethyl)-1,2,3,4-tetrahydrofluoranthene of boiling point (under a pressure of 0.07 mm.) of 175–185° C.; its hydrochloride melts at 278° C.

1 - (γ-piperidinopropyl) - 1,2,3,4 - tetrahydrofluoranthene of boiling point (under a pressure of 0.05 mm.) of 180–185° C. is obtained according to the same procedure from 33 parts by weight of γ-chloropropylpiperidine; it forms a hydrochloride of melting point 215° C.

Further, 1-(β-morpholinoethyl)-1,2,3,4 - tetrahydrofluoranthene of boiling point (under a pressure of 0.05 mm.) of 178° C. and melting point 85–88° C. is similarly obtained from 32.6 parts by weight of β-chloroethylmorpholine; its hydrochloride melts at 228–232° C., and the picrate at 202–203° C. Likewise, 1-(γ-morpholinopropyl)-1,2,3,4-tetrahydrofluoranthene is similarly prepared starting from 35.8 parts by weight of γ-chloropropylmorpholine, which boils at 185–190° C. at 0.02 mm. and forms a hydrochloride of melting point 223–226° C.

In an analogous manner by the reaction of 41.2 parts by weight of 1,2,3,4-tetrahydrofluoranthene with 30.0 parts by weight of γ-chloropropyldiethylamine, there is obtained 1-(γ-diethylaminopropyl)-1,2,3,4-tetrahydrofluoranthene of boiling point (under a pressure of 0.04 mm.) of 165° C., the hydrochloride of which melts at 194–195° C. and the picrate between 154–156° C.; in addition, with 42.0 parts by weight of β-chloroethylbutylamine, there is obtained 1-(β-dibutylaminoethyl)-1,2,3,4-tetrahydrofluoranthene as an oil of boiling point (under a pressure of 0.005 mm.) of 165° C.; its hydrochloride has a melting point of 179–180° C.

By using 12.5 parts by weight of 2,2,4-trimethyl-1,2,3,4-tetrahydrofluoranthene in the reaction with 5.9 parts by weight of β-chloroethyldimethylamine, there is obtained 1-(β-dimethylaminoethyl)-2,2,4-trimethyl - 1,2,3,4 - tetrahydrofluoranthene of boiling point (under a pressure of 0.02 mm.) of 141–143° C., whose hydrochloride melts at 220–222° C., while with 7.0 parts by weight of β-chloroethyldiethylamine, the aforesaid quantity of 2,2,4-trimethyl-1,2,3,4-tetrahydrofluoranthene produces 1 - (β - diethylaminoethyl) - 2,2,4 - trimethyl-1,2,3,4-tetrahydrofluoranthene of boiling point (under a pressure of 0.02 mm.) of 140–145° C.; the hydrochloride of which melts at 205–207° C.

By treatment of the resultant amines with quaternizing agents, for example with methyl bromide, the corresponding quaternary compounds can be prepared, for example the methobromide of 1-(β-dimethylaminoethyl)-1,2,3,4-tetrahydrofluoranthene of melting point 215–216° C. and the methobromide of 1-(γ-piperidinopropyl)-1,2,3,4-tetrahydrofluoranthene which melts at 90° C., as well as the methohalides of 1-(γ-dimethylaminopropyl)-1,2,3,4-tetrahydrofluoranthene.

In a manner analogous to the reactions in the above examples, 1,2,3,4-tetrahydrofluoranthene may be reacted also with 1-chloro-2-hydroxyethane or 1-bromo-3-hydroxypropane. In the 1-(β-hydroxyethyl- or 1 - (γ - hydroxypropyl)-1,2,3,4-tetrahydrofluoranthene thus obtained, the hydroxyl group is then replaced by a halogen atom, for example by chlorine by means of thionyl chloride and the halogen compound obtained reacted with ammonia, primary or secondary amines such as methylamine, dimethylamine, diethylamine, piperidine or dibutylamine. Thus in addition to the above named compounds there are obtained for example 1-(β-aminoethyl)-1,2,3,4-tetrahydrofluoranthene, 1-(γ-aminopropyl)-1,2,3,4 - tetrahydrofluoranthene, 1 - (β - methylaminoethyl)-1,2,3,4-tetrahydrofluoranthene and 1-(γ-methylaminopropyl)-1,2,3,4-tetrahydrofluoranthene.

Having thus described the invention, what is claimed is:

1. The 1,2,3,4-tetrahydrofluoranthenes which bear in the 1-position a grouping selected from the class consisting of

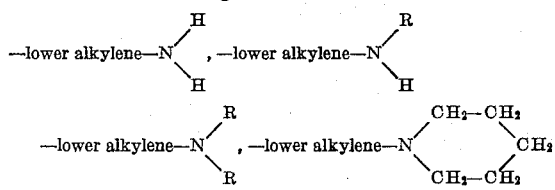

and

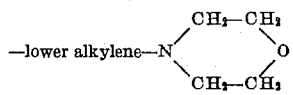

and the acid salts and quaternary compounds of the said 1,2,3,4-tetrahydrofluoranthenes, R standing for lower alkyl.

2. The acid salts of the 1-aminoalkyl-1,2,3,4-tetrahydrofluoranthenes, the alkyl being lower alkyl.

3. The acid salts of the 1-(dialkylaminoalkyl)-1,2,3,4-tetrahydrofluoranthenes, the alkyl in each case being lower alkyl.

4. The acid salts of the 1-($\beta$-diethylaminoethyl)-1,2,3,4-tetrahydrofluoranthenes.

5. The acid salts of the 1-($\beta$-dimethylaminoethyl)-1,2,3,4-tetrahydrofluoranthenes.

6. The acid salts of the 1-(piperidinoalkyl)-1,2,3,4-tetrahydrofluoranthenes, the alkyl being lower alkyl.

7. The acid salts of the 1-($\beta$-piperidinoethyl)-1,2,3,4-tetrahydrofluoranthenes.

8. The acid salts of the 1-($\gamma$-piperidinopropyl)-1,2,3,4-tetrahydrofluoranthenes.

9. A process for preparing an acid salt of a 1-(aminoalkyl)-1,2,3,4-tetrahydrofluoranthene, which comprises heating a member selected from the group consisting of the alkali metal and alkaline earth metal compounds of the corresponding 1,2,3,4-tetrahydrofluoranthene with a compound of the formula R'-halide wherein R' is a member selected from the group consisting of

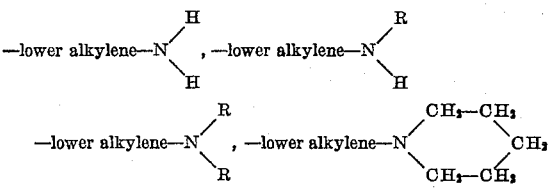

and

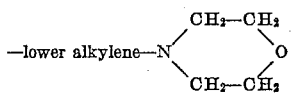

R standing for lower alkyl, and converting the product to the acid salt by treating it with the corresponding acid.

10. A process for preparing an acid salt of a 1-(piperidinoalkyl)-1,2,3,4-tetrahydrofluoranthene, which comprises heating an alkali metal compound of the corresponding 1,2,3,4-tetrahydrofluoranthene with a piperidinoalkyl halide, and converting the product to the acid salt by treating it with the corresponding acid.

11. A process for preparing an acid salt of 1-($\beta$-diethylaminoethyl)-1,2,3,4-tetrahydrofluoranthene, which comprises heating an alkali metal compound of the corresponding 1,2,3,4-tetrahydrofluoranthene with a $\beta$-diethylaminoethyl halide, and converting the product to the acid salt by treating it with the corresponding acid.

12. A process for preparing an acid salt of 1-($\beta$-dimethylaminoethyl)-1,2,3,4-tetrahydrofluoranthene, which comprises heating an alkali metal compound of the corresponding 1,2,3,4-tetrahydrofluoranthene with a $\beta$-dimethylaminoethyl halide, and converting the product to the acid salt by treating it with the corresponding acid.

13. A process for preparing an acid salt of 1-($\beta$-piperidinoethyl)-1,2,3,4-tetrahydrofluoranthene, which comprises heating an alkali metal compound of the corresponding 1,2,3,4-tetrahydrofluoranthene with a $\beta$-piperidinoethyl halide, and converting the product to the acid salt by treating it with the corresponding acid.

14. A process for preparing an acid salt of 1-($\gamma$-piperdinopropyl)-1,2,3,4-tetrahydrofluoranthene, which comprises heating an akali metal compound of the corresponding 1,2,3,4-tetrahydrofluoranthene with a $\gamma$-piperidinopropyl halide, and converting the product to the acid salt by treating it with the corresponding acid.

15. The hydrochloride of 1-($\beta$-diethylaminoethyl)-1,2,3,4-tetrahydrofluoranthene.

16. The phosphate of 1-($\beta$-diethylaminoethyl)-1,2,3,4-tetrahydrofluoranthene.

17. The hydrochloride of 1-($\beta$-dimethylaminoethyl)-1,2,3,4-tetrahydrofluoranthene.

18. The hydrochloride of 1-($\beta$-piperidinoethyl)-1,2,3,4-tetrahydrofluoranthene.

19. The hydrochloride of 1-($\gamma$-piperidinopropyl)-1,2,3,4-tetrahydrofluoranthene.

KARL HOFFMANN.
EUGEN TAGMANN.

REFERENCES CITED

The following references are of record in the file of this patent:

UNITED STATES PATENTS

| Number | Name | Date |
|---|---|---|
| 1,873,402 | Herzberg et al. | Aug. 23, 1932 |
| 2,056,046 | Fourneau | Sept. 29, 1936 |
| 2,368,006 | Cusic | Jan. 23, 1945 |

OTHER REFERENCES

Ser. No. 309,702, Scheuing et al. (A. P. C.) published April 20, 1943.